(12) United States Patent
Bilde

(10) Patent No.: US 10,321,634 B2
(45) Date of Patent: Jun. 18, 2019

(54) COMBINE HARVESTER GRAIN CLEANING SYSTEM

(71) Applicant: AGCO International GmbH, Neuhausen (CH)

(72) Inventor: Morten Leth Bilde, Langaa (DK)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 16/077,230

(22) PCT Filed: Mar. 21, 2017

(86) PCT No.: PCT/EP2017/056619
§ 371 (c)(1),
(2) Date: Aug. 10, 2018

(87) PCT Pub. No.: WO2017/162624
PCT Pub. Date: Sep. 28, 2017

(65) Prior Publication Data
US 2019/0059233 A1    Feb. 28, 2019

(30) Foreign Application Priority Data
Mar. 22, 2016  (GB) .................................. 1604781.3

(51) Int. Cl.
*A01F 12/44* (2006.01)
(52) U.S. Cl.
CPC ............ *A01F 12/444* (2013.01); *A01F 12/44* (2013.01); *A01F 12/442* (2013.01); *A01F 12/446* (2013.01)

(58) Field of Classification Search
CPC .... A01F 12/444; A01F 12/446; A01F 12/442; A01F 12/44; A01D 41/1243; A01D 75/282
See application file for complete search history.

(56) References Cited

U.S. PATENT DOCUMENTS 1,527,090 A    2/1925   Simard
2,739,597 A *  3/1956   Buttars ................ A01D 75/282
                                                    209/274
(Continued)

FOREIGN PATENT DOCUMENTS

EP    0727135 A1    8/1996
EP    1849350 A1    10/2007
(Continued)

OTHER PUBLICATIONS

UK Intellectual Property Office, International Search Report for related UK Application No. GB1604781.3 dated Sep. 22, 2016.
(Continued)

*Primary Examiner* — Arpad Fabian-Kovacs

(57) ABSTRACT

A grain cleaning system in a combine harvester including a pair of side walls, a rear wall that extends between the side walls, a sieve that oscillates in a fore-and-aft path between the side walls, a fan unit for generating a cleaning airstream, and an outlet for discharging residue from a grain-cleaning process. The outlet is framed in part by a lower edge of the rear wall. An aperture is provided in the rear wall to provide air relief to enhance the fore-to-aft flow of the cleaning airstream. Optionally, an auxiliary fan may drive air through the aperture.

10 Claims, 3 Drawing Sheets

(56) References Cited

U.S. PATENT DOCUMENTS

| | | | | |
|---|---|---|---|---|
| 2,923,409 | A | * | 2/1960 | Yonash .................. A01F 12/446 209/274 |
| 3,712,309 | A | * | 1/1973 | Schmitz .................. A01F 12/40 460/112 |
| 4,018,232 | A | * | 4/1977 | Rowland-Hill ........... A01F 7/06 460/84 |
| 4,250,897 | A | * | 2/1981 | Glaser .................... A01D 67/00 415/7 |
| 4,531,528 | A | | 7/1985 | Peters et al. |
| 4,561,972 | A | * | 12/1985 | Alm ...................... A01D 75/282 209/254 |
| 4,637,406 | A | * | 1/1987 | Guinn .................... A01F 12/40 241/101.71 |
| 5,791,986 | A | * | 8/1998 | Underwood ............ A01F 12/44 460/101 |
| 6,056,639 | A | * | 5/2000 | Gryspeerdt ............. A01F 12/44 460/101 |
| 6,547,169 | B1 | * | 4/2003 | Matousek .......... A01D 41/1243 239/661 |
| 6,863,605 | B2 | * | 3/2005 | Gryspeerdt ............. A01F 12/40 460/111 |
| 6,908,379 | B2 | * | 6/2005 | Gryspeerdt ........ A01D 41/1243 460/111 |
| 7,717,779 | B1 | * | 5/2010 | Weichholdt ........ A01D 41/1243 460/112 |
| 7,744,450 | B2 | * | 6/2010 | Hoskinson .............. A01F 12/44 460/111 |
| 7,896,732 | B2 | * | 3/2011 | Benes ................ A01D 41/1243 460/112 |
| 8,585,475 | B2 | * | 11/2013 | Isaac .................. A01D 41/1243 460/111 |
| 8,992,294 | B2 | * | 3/2015 | Dilts .................. A01D 41/1243 460/111 |
| 9,137,944 | B2 | * | 9/2015 | Dilts .................. A01D 41/1243 |
| 9,854,742 | B2 | * | 1/2018 | Bilde ...................... A01F 12/44 |
| 2004/0029624 | A1 | * | 2/2004 | Weichholdt ............. A01F 12/40 460/112 |
| 2005/0245301 | A1 | | 11/2005 | Redekop et al. |
| 2008/0081680 | A1 | | 4/2008 | Hoskinson et al. |
| 2010/0267432 | A1 | * | 10/2010 | Roberge ............. A01D 41/1252 460/59 |

FOREIGN PATENT DOCUMENTS

| | | |
|---|---|---|
| EP | 2187061 A2 | 5/2010 |
| GB | 1531038 A | 11/1978 |
| JP | 2009017838 A | 1/2009 |
| WO | 92/05687 A | 4/1992 |

OTHER PUBLICATIONS

EP Patent Office, International Search Report for International Patent Application No. PCT/EP2017/056619, dated Jun. 8, 2017.

* cited by examiner

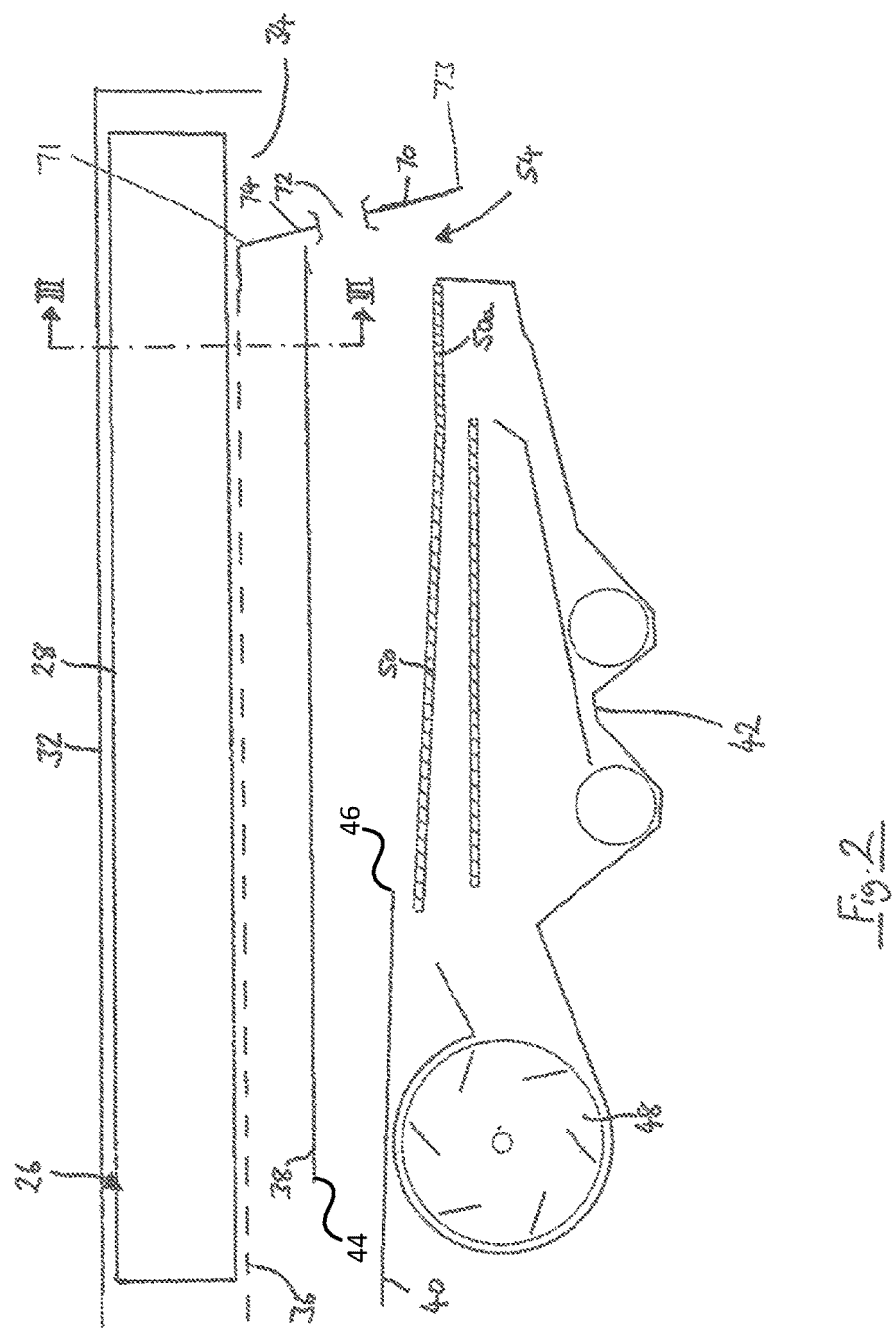

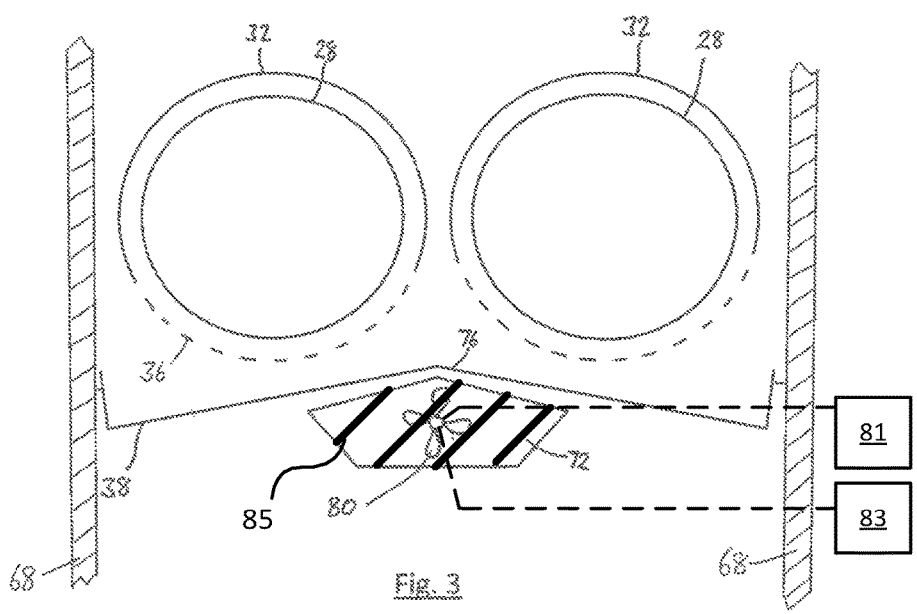

COMBINE HARVESTER GRAIN CLEANING SYSTEM

BACKGROUND OF THE INVENTION

Field of Invention

The invention relates to combine harvesters and particularly to grain cleaning systems installed thereon, the cleaning system having one or more sieves which oscillate to clean grain, and a fan unit which generates a cleaning airstream.

Description of Related Art

Self-propelled combine harvesters have been used by farmers since the early twentieth century to harvest grain crops from fields. Since then the basic architecture of the crop processing system employed has not changed significantly and is well known.

A cutting header cuts and gathers a standing crop which is conveyed generally rearwardly to crop processing apparatus. On-board threshing and separating apparatus serve to thresh the stream of cut crop material and separate the grain or seeds from the straw. The straw material is typically conveyed to the rear of the separating apparatus from where it is discharged to the ground whilst the grain and material other than grain (MOG) separated therefrom is convey to, and passed through, a cleaning system or 'shoe'.

A conventional grain cleaning system normally comprises one or more sieves which are driven in oscillation to convey the grain and MOG in a generally rearward direction whilst screening the grain from the MOG, the grain falling to a clean grain trough leaving the MOG to be discharged through an outlet at the rear of the cleaning shoe.

The cleaning shoe further comprises a fan unit towards the front which generates a cleaning airstream. At least a portion of the airstream is directed through the sieves from underneath to assist in lifting the lighter MOG away from the grain. The MOG-laden airstream exits the cleaning shoe through the outlet.

As capacity demands are increased there is a need to increase the capacity of the cleaning shoe. One known approach is to increase the size of the sieves in either width or length so as to increase the available screening area. Increases in width are often limited by the maximum possible width of the overall machine imposed by highway legislation. Therefore, there is a trend for cleaning systems with longer sieves. An unfortunate effect of employing longer sieves is the resultant difficulty in achieving a uniform airflow or pressure differential along the length of the sieves. It has been observed that the pressure differential across the sieve reduces significantly towards the rearmost regions, leading to increased occurrences of the sieves blocking, an effect often referred to as 'collapse of the sieve'. Once the sieve has collapsed heavy losses of grain can occur through the outlet of the cleaning shoe.

SUMMARY OF THE INVENTION

According to the invention there is provided a combine harvester comprising a grain cleaning system, the cleaning system comprising a pair of side walls, a rear wall that extends between the side walls, a sieve operable to oscillate in a fore-and-aft path between the side walls, a fan unit for generating a cleaning airstream, and an outlet for discharging residue from a grain cleaning process, wherein the outlet is framed in part by a lower edge of the rear wall, and wherein the rear wall is provided with an aperture.

The aperture in the rear wall of the cleaning shoe serves to provide means of air relief for an improved distribution of the cleaning airstream in the cleaning shoe.

In order to overcome the aforementioned problems that are known to cause collapse of the chaffer combine designers have naturally resorted to increasing the fan speed to create a sufficient pressure differential across rear portions of the sieves. However, it has been observed that the air distribution inside the cleaning shoe becomes more disrupted with such high fan speeds, sometimes even resulting in regions of forward flow air which is detrimental to the overall grain cleaning system which relies on a generally rearward conveyance of the MOG.

The 'backpressure' exerted on the cleaning airstream is thought to be caused by the restricted outlet at the rear of the cleaning shoe. The trend for inclusion of chaff spreaders and straw choppers in the area immediately behind the cleaning shoe serves only to compound this problem. By providing an aperture in the rear wall of the cleaning shoe, the backpressure is reduced thus allowing a freer flow of air from fore to aft, ultimately improving the performance of the cleaning system.

In one embodiment the rear wall of the cleaning shoe serves also as a component of a discharge chute for guiding straw discharged by overhead separating apparatus, wherein the aperture extends through to the discharge chute. A protective grill may be provided to prevent straw in the discharge chute from blocking the aperture.

The cleaning airstream is channeled through the cleaning shoe in a generally rearward direction. In one embodiment the volume of the airflow channel provided by the cleaning shoe is defined at the sides by side walls, at the base by a floor and/or sieves, and above by a return pan which is arranged to catch crop material separated by the separating apparatus and convey the collected material in a generally forward direction. As such the underside of the return pan acts as a ceiling to the cleaning system.

The aperture is preferably as high as possible in the rear wall, proximate to the underside of the return pan if provided. Therefore, the lifting and conveying of the MOG is enhanced.

In one embodiment a return pan may have a floor profile that defines a longitudinal crest as disclosed in co-pending international patent application WO-2016/166016. The contoured floor of the return pan serves to present the conveyed material to the cleaning system in a preferred manner. The underside of the return pan may define a longitudinal channel or groove which, advantageously, provides a raised region in the cleaning shoe ceiling thus allowing the aperture to be disposed higher in the cleaning shoe if vertically and laterally aligned with the channel.

The combine harvester preferably further comprises an auxiliary fan located inside the aperture, the auxiliary fan being operable to positively draw air away from the cleaning system. By providing a dedicated fan to actively draw air through the aperture the air distribution in the cleaning shoe is not only improved, but is also more controllable. In a preferred arrangement the speed of the auxiliary fan is controlled in conjunction with the main cleaning fan speed.

The auxiliary fan may be driven by a hydraulic motor.

BRIEF DESCRIPTION OF THE DRAWINGS

Further advantages of the invention will become apparent from reading the following description of a specific embodiment with reference to the appended drawings in which:

FIG. 2 is a schematic longitudinal sectional view of a cleaning system in accordance with an embodiment of the invention; and FIG. 3 is a schematic transverse section viewed rearwardly along the line III-III of FIG. 2.

DETAILED DESCRIPTION OF SPECIFIC EMBODIMENTS

Figure 1:
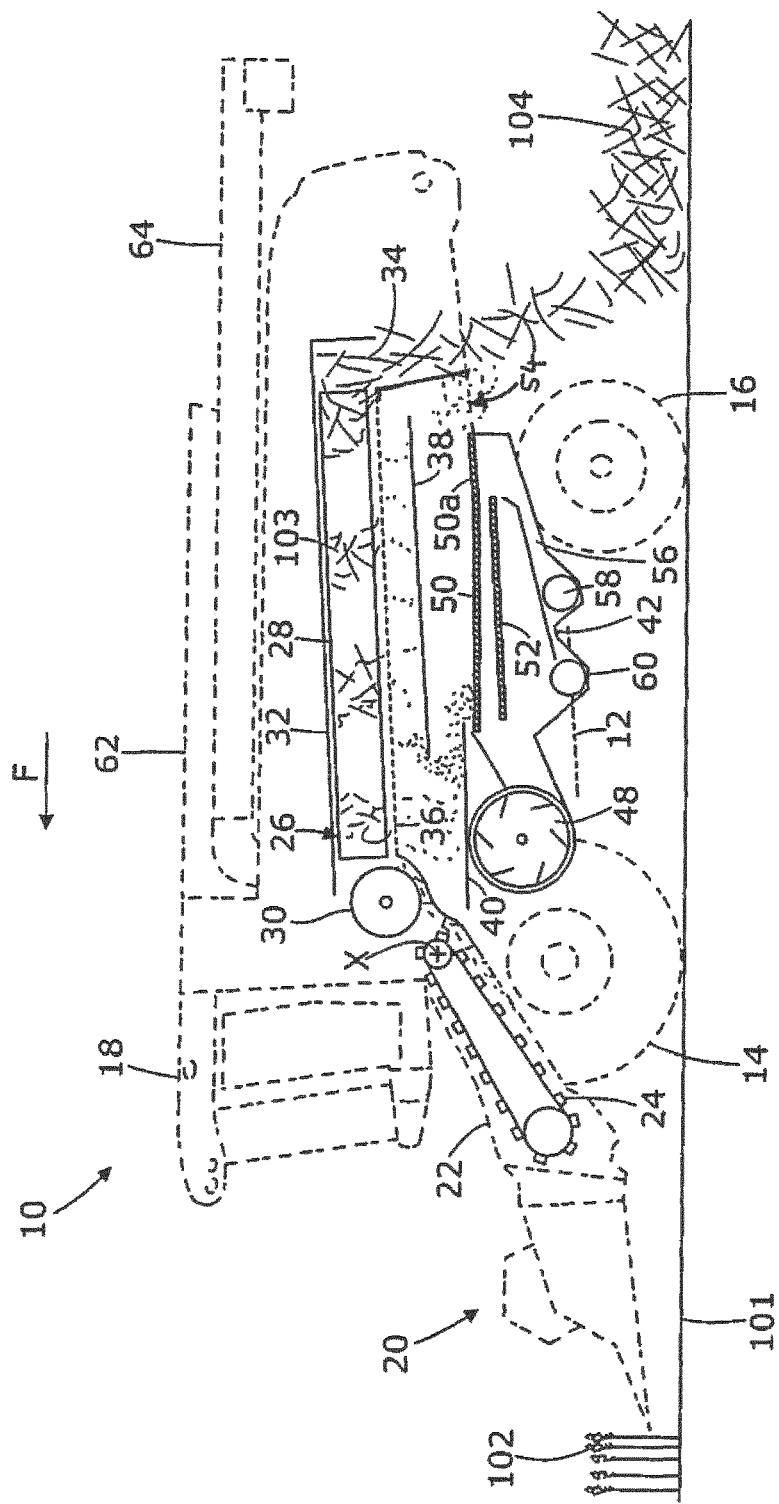
FIG. 1 is a schematic sectional view of a combine harvester having a known crop processing architecture.

An embodiment of the invention will now be described with reference to the drawings. Relative terms such as forward, rearward, transverse, lateral, longitudinal and sideways will be made with reference to the normal forward direction of travel of the combine 10 and indicated by arrow F. The terms vertical and horizontal will be made with reference to the level ground 101 upon which the combine 10 is disposed. In other words the Cartesian axes of 'longitudinal', 'transverse', and 'vertical' are made in relation to the frame 12 of combine 10 and are not affected by any slope in the ground. The terms "upstream" and "downstream" are made with reference of the general direction of crop flow along the material conveyance systems described.

FIG. 1 illustrates in schematic form the main components of the crop processing system of a combine harvester 10 and will be used to explain the flow of material below. The crop processing system is shown in solid lines whilst the outline profile of harvester 10 is shown in ghost form.

Combine harvester 10, hereinafter referred to as 'combine', includes a frame 12 supported on front wheels 14 and rear steerable wheels 16 which engage the ground 101. A driver's cab 18 is also supported on the frame 12 and houses a driver's station from where a driver controls the combine 10.

A cutting header 20 is detachably supported on the front of a feederhouse 22 which is pivotable about a transverse axis x to lift and lower the header 20 in a conventional manner.

The combine 10 is driven in a forward direction (arrow F) across a field of standing crop 102 in a known manner. The header 20 serves to cut and gather the standing crop material before conveying such as a crop material stream into feederhouse 22. An elevator 24, normally in the form of a chain-and-slat elevator as shown, is housed within the feederhouse 22 and serves to convey the crop material stream upwardly and rearwardly from the header 20 to the crop processor designated generally at 26. At this stage the crop material stream is unprocessed.

The crop processor 26 of the illustrated combine 10 includes a pair of axial flow threshing and separating rotors 28 fed by a tangential flow, crop material impelling, feed beater 30. It should be appreciated however that alternative types of crop processor may be used without deviating from the scope of the invention. For example, the crop processor may instead include a conventional tangential flow threshing cylinder with a plurality of straw walkers for separation. Alternatively, a single axial-flow processing rotor may be employed.

Turning back to FIG. 1, the feed beater 30 rotates on a transverse axis and comprises crop engaging vanes (not shown) which convey the crop material stream under the beater and into rotor housings 32 which each house one of said rotors 28. It should be appreciated that only the left-hand rotor 28 and housing 32 is shown in FIG. 1 whereas the right-hand equivalent is hidden from view.

The rotors 28 are positioned to have a generally longitudinal, or fore and aft, rotation axis which is normally inclined upwardly towards the rear of the combine 10.

Flighting elements (not shown) provided on the front end of each rotor 28 engage the crop material stream which is then conveyed as a ribbon or mat 103 in a generally rearward axial and helical path in the space between the rotor 28 and the rotor housing 32.

Axial flow rotors 28 serve to thresh the crop stream in a front region, separate the grain therefrom in a rear region, and eject the straw residue via a straw discharge chute 34 provided below a rear portion of the rotors 28, the straw falling either directly onto the ground in a windrow 104 as shown, or via a straw chopper (not shown).

A part-cylindrical grate 36 provided in the underside of each rotor housing 32 allows the separated material to fall by gravity onto either a return pan 38 located below a rear section of the processor 26, or directly onto a stratification pan 40 located below a front section of the processor 26. In reality the separated material falling through the grate 36 is typically a mix of grain and material other than grain (MOG) which may include chaff, tailings and some straw.

The return pan 38 and stratification pan 40 together serve as a material conveyance system arranged to convey the separated crop material to a grain cleaning shoe designated generally at 42. The pans 38, 40 each include a respective linkage (not shown) to convert a torque source into oscillating motion to oscillate the pans in a generally fore-and-aft direction. Combined with a transversely rippled or corrugated floor, the oscillating movement of the return pan 38 and stratification pan 40 propels the material generally forwardly or rearwardly respectively.

The return pan 38 "returns" the separated material incident thereon towards the front of the combine 10 (in the direction F) to a front discharge edge 44 from where the material falls or cascades onto the stratification pan 40. The material on the stratification pan 40 is conveyed rearwardly to a rear discharge edge 46 from where the material falls into the cleaning system or "shoe" 42.

The grain-MOG mix falls from the rear discharge edge 46 into the cleaning shoe 42 where the cascading mix is subjected to a cleaning airstream generated by fan 48, before falling onto the front of upper sieve or chaffer 50.

Chaffer 50 comprises adjustable louvres supported on a frame which is driven in fore-and-aft oscillating manner. The material which settles on the chaffer 50 is conveyed in a generally rearward direction and the heavier smaller grain-rich material passes between the louvres onto an underlying lower sieve 52, whereas the lighter larger material passes to the end of the chaffer and out of the rear of the machine at shoe outlet 54. A rear section of chaffer 50a is commonly independently adjustable and is configurable to allow tailings to pass there through into a re-threshing region 56 from where the tailings are conveyed via a re-threshing auger 58 back to the processor 26.

Lower sieve 52 is also driven in an oscillating manner to convey the collected grain-MOG mix rearwardly wherein the material falling there through is collected by a clean grain auger 60 for conveyance to an elevator (not shown) for onward conveyance to a grain tank 62. Material which does not pass through lower sieve 52 and is instead conveyed off the rear edge thereof falls into re-threshing region 56 for subsequent re-threshing.

The airstream generated by fan unit 48 is also conveyed by ducting up through lower sieve 52 and chaffer 50 to encourage lifting of the MOG from the chaffer surface.

For completeness the combine 10 includes an unloading system which includes an unloading auger 64.

An aspect of the invention relates to the cleaning shoe 42 and in particular to the improvement of the cleaning airflow distribution inside the shoe 42 to improve conveyance of the MOG. FIG. 2 shows a vertical section of the cleaning shoe 42 and processor 26.

As mentioned above, the airstream generated by the fan 48 exits the fan housing at locations under and over the front edge of chaffer 50, whereupon the airstream is funneled or guided generally rearwardly by side walls 68 (see FIG. 3) and the underside of return pan 38, which acts like a ceiling. In known combines, a rear wall of the cleaning shoe forces the airstream downwardly through the shoe outlet. However, in accordance with an aspect of the invention, an aperture 72 is provided in the rear wall 70 to permit a degree of air relief, wherein a portion of the airstream exits the shoe volume through the aperture 72.

The rear wall 70 is fixed in position between the side walls 68 and has a top edge 71 that resides adjacent a discharge edge of the separating apparatus whether that be defined by the rear edge of rotor grate 36 as shown or straw-walkers in an alternative embodiment. Aside from the aperture 72 provided therein, the rear wall presents a continuous surface bounded by the top edge 71, a bottom edge 73, and the side walls 68.

By providing an extra outlet for the airstream, the backpressure created by the limited size of the shoe outlet 54 is reduced, thus improving the general fore-to-aft flow and reducing the areas of "dead" zero airspeed observed.

The rear wall 70 of the cleaning shoe 42 in this embodiment serves also to provide a surface 74 of the straw discharge chute 34, on the opposite side to the cleaning shoe 42. As such the aperture 72 effectively joins the volume associated with the inside of the shoe 42 and the volume associated with the inside of the straw discharge chute 34. A grill 85 may optionally be provided over the aperture 72 to prevent straw from entering the cleaning shoe 42. However, it is envisaged that the differential air pressure (high pressure in shoe 42, lower pressure in straw discharge chute 34) will prevent migration of straw into the shoe 42.

The aperture 72 is best provided as high as is practically possible in the rear wall 70 to encourage the airflow upwardly so as to lift and maintain MOG away from the surface of the chaffer 50. With reference to FIG. 3, which shows a transverse vertical section through the cleaning shoe 42 and processor 26, it can be seen that the return pan 38 comprises a conveyance floor which defines a central longitudinal crest or ridge 76. This return pan floor profile is similar to that described with reference to FIG. 17 of International Patent Application Publication WO 2016/166016, the contents of which are incorporated herein by reference. The underside of return pan 38 has a corresponding longitudinal channel or groove under the crest 76. Advantageously, this permits the aperture 72 to be transversely and vertically aligned with the channel and thus extend to a greater height in the cleaning shoe 42.

An auxiliary fan 80 is mounted inside the aperture, or at least in a manner which serves to positively draw air away from the cleaning shoe 42, through the aperture 72 and into the straw discharge chute 34. The provision of auxiliary fan 80 permits greater control over the air distribution and a more uniform air distribution in the shoe 42.

The auxiliary fan 80 may be driven by a hydraulic motor 81, an electric motor, or via a mechanical drive. The auxiliary fan 80 may be controlled by a controller 83.

In summary there is provided a grain cleaning system in a combine harvester comprising a pair of side walls, a rear wall that extends between the side walls, a sieve operable to oscillate in a fore-and-aft path between the side walls, a fan unit for generating a cleaning airstream, and an outlet for discharging residue from a grain cleaning process. The outlet is framed in part by a lower edge of the rear wall. An aperture is provided in the rear wall to provide a means of air relief to enhance the fore to aft flow of the cleaning airstream. Optionally, an auxiliary fan may be provided to drive air through the aperture.

It should be emphasized that the above-described embodiments of the present disclosure are merely possible examples of implementation, merely set forth for a clear understanding of the principles of the disclosure. Many variations and modifications may be made to the above-described embodiments of the disclosure without departing substantially from the spirit and principles of the disclosure.

The invention claimed is:

1. A combine harvester comprising a grain cleaning system, the cleaning system comprising:
   a pair of side walls:
   a sieve operable to oscillate in a fore-and-aft path between the side walls;
   a rear wall that extends between the side walls, the rear wall defining an aperture therethrough, wherein a lower edge of the rear wall partially defines an outlet structured to discharge residue downward from a volume defined in part by the pair of side walls, the sieve, and the rear wall; and
   a main fan unit operable to provide an airstream upward through the sieve and partially through the aperture.

2. The combine harvester according to claim 1, further comprising:
   grain separating apparatus located above the cleaning system; and
   a discharge chute arranged to guide residue straw discharged by the grain separating apparatus, wherein the rear wall of the cleaning shoe serves also as an active surface of the discharge chute.

3. The combine harvester according to claim 2, further comprising a return pan positioned under the grain separating apparatus configured to catch crop material separated by such grain separating apparatus and convey the collected crop material in a generally forward direction, wherein an underside of the return pan provides a ceiling to the cleaning system.

4. The combine harvester according to claim 2, wherein the grain separating apparatus comprises a pair of axial-flow crop processing rotors having respective rotation axes which are aligned longitudinally and mutually side-by-side.

5. The combine harvester according to claim 3, wherein the return pan comprises a floor that defines a longitudinal crest which corresponds to a channel in the underside of the return pan, wherein the aperture is positioned vertically and transversely aligned with said channel.

6. The combine harvester according to claim 5, wherein the aperture extends above a height defined by a rear portion of the return pan floor.

7. The combine harvester according to claim 1, further comprising an auxiliary fan located inside the aperture and configured to draw air away from the cleaning system.

8. The combine harvester according to claim 7, wherein the auxiliary fan is driven by a hydraulic motor.

9. The combine harvester according to claim 7, further comprising a controller configured to control a speed of the auxiliary fan as a function of a speed of the main fan.

10. The combine harvester according to claim 1, further comprising a grill that covers the aperture.

\* \* \* \* \*